United States Patent
Ghosh et al.

(10) Patent No.: US 8,800,017 B2
(45) Date of Patent: Aug. 5, 2014

(54) METHOD AND APPARATUS FOR COPY PROTECTING A DIGITAL ELECTRONIC DEVICE

(75) Inventors: Subir Ghosh, San Jose, CA (US); Gabriele Sartori, Fremont, CA (US)

(73) Assignee: nComputing, Inc., Santa Clara, CA (US)

( * ) Notice: Subject to any disclaimer, the term of this patent is extended or adjusted under 35 U.S.C. 154(b) by 420 days.

(21) Appl. No.: 12/474,681

(22) Filed: May 29, 2009

(65) Prior Publication Data
US 2010/0306838 A1    Dec. 2, 2010

(51) Int. Cl.
   *H04L 9/32*    (2006.01)

(52) U.S. Cl.
   CPC ......... *H04L 9/3234* (2013.01); *H04L 2209/605* (2013.01)
   USPC .............................................................. 726/9

(58) Field of Classification Search
   CPC ....................... H04L 9/3234; H04L 2209/605
   USPC ........................................ 726/9, 20; 713/185
   See application file for complete search history.

(56) References Cited

U.S. PATENT DOCUMENTS

| | | | |
|---|---|---|---|
| 7,131,004 B1* | 10/2006 | Lyle ............................... | 713/169 |
| 7,532,723 B2* | 5/2009 | Chitrapu et al. ................. | 380/44 |
| 7,533,264 B2* | 5/2009 | Ballinger et al. ............. | 713/172 |
| 7,562,218 B2 | 7/2009 | Kirkup et al. | |
| 2001/0033654 A1* | 10/2001 | Wieser ............................. | 380/28 |
| 2004/0153555 A1* | 8/2004 | Haverinen et al. ............. | 709/229 |
| 2005/0144452 A1 | 6/2005 | Lynch et al. | |
| 2005/0278259 A1 | 12/2005 | Gunaseelan et al. | |
| 2006/0184796 A1* | 8/2006 | Fahrny .......................... | 713/176 |
| 2007/0011729 A1* | 1/2007 | White .............................. | 726/9 |
| 2007/0101152 A1* | 5/2007 | Mercredi et al. .............. | 713/185 |
| 2007/0239605 A1* | 10/2007 | Munguia et al. ................ | 705/50 |
| 2008/0104684 A1* | 5/2008 | Lunde et al. ...................... | 726/6 |

FOREIGN PATENT DOCUMENTS

WO    WO-2010138880 A1    12/2010

OTHER PUBLICATIONS

"International Application Serial No. PCT/US2010/036671, Search Report mailed Jul. 27, 2010", 4 pgs.
"International Application Serial No. PCT/US2010/036671, Written Opinion mailed Jul. 27, 2010", 4 pgs.
"International Application Serial No. PCT/US2010/036671, International Preliminary Report on Patentability mailed Dec. 8, 2011", 6 pgs.

* cited by examiner

*Primary Examiner* — Peter Shaw
(74) *Attorney, Agent, or Firm* — Schwegman, Lundberg & Woessner, P.A.

(57) ABSTRACT

A device and a method of authenticating an electronic device are described. The method may comprise transmitting a token value and a parameter value to the electronic device and selecting a private key within the electronic device using the parameter value. The token value may be processed with a method selected by the parameter value to generate a processed token. The processed token may be compared with an expected processed token and the electronic device may be authenticated if the processed token compares favorably with said expected processed token.

20 Claims, 8 Drawing Sheets

Figure 5

METHOD AND APPARATUS FOR COPY PROTECTING A DIGITAL ELECTRONIC DEVICE

TECHNICAL FIELD

The present invention relates to the field of digital electronic devices. In particular, but not by way of limitation, the present invention discloses techniques for copy protecting digital electronic devices to prevent unauthorized copies.

BACKGROUND

Digital electronic devices have become a mainstay of modern life. With cellular telephones, digital music players, personal computers, digital television sets, and other digital electronic devices, virtually everyone in modern society uses one or more digital electronic devices.

As with the rise of any industry, the rise of the digital electronics industry has been accompanied by the rise of related criminal enterprises. With the rise of digital electronic devices, there has been a growth in identity theft wherein criminals steal personal information about a person from digital electronic devices in order to steal a person's identity for use in committing fraud. For example, a unique identification code of a cellular telephone can be cloned such that a criminal may make telephone calls that are charged to the account of another person.

Another criminal enterprise related to digital electronics is the theft of the intellectual property of the actual digital electronic devices. For example, a criminal entity may copy the electronics design and computer code of a valuable digital electronic device in order to build and sell unauthorized copies of that digital electronic device. Such copies of digital electronic devices violate the trademark, copyright, and/or patent rights of the original maker of the copied digital electronics device.

Although legal remedies exist to go after entities that create unauthorized copies of digital electronic devices, such legal remedies are not always easy to enforce. It is difficult to locate and serve papers on an entity that is creating unauthorized copies of digital electronic devices. The laws and legal systems of various markets may not be mature enough to handle difficult intellectual property cases. Legal suits can also be very expensive to pursue due to court costs and legal fees. Thus, it would be advantageous to prevent copies of digital electronic devices from being created in the first place.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although example embodiments are mainly disclosed with reference to a thin-client terminal system, the teachings can be used for other types of digital electronic devices such as digital media servers, digital media players, internet appliances, etc. Furthermore, the example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Example Computer Systems

The present disclosure concerns digital electronic devices. Although it may not be immediately apparent, most digital electronic devices are essentially computer systems. For example, digital music players, digital cellular telephones, and network routers are computer systems that include some type of computer processor for processing instructions, some memory for storing instructions and data, and some input/output system for interacting with the outside world thus forming a standard computer system. Thus, the basics of a typical computer system are presented here.

Figure 1:
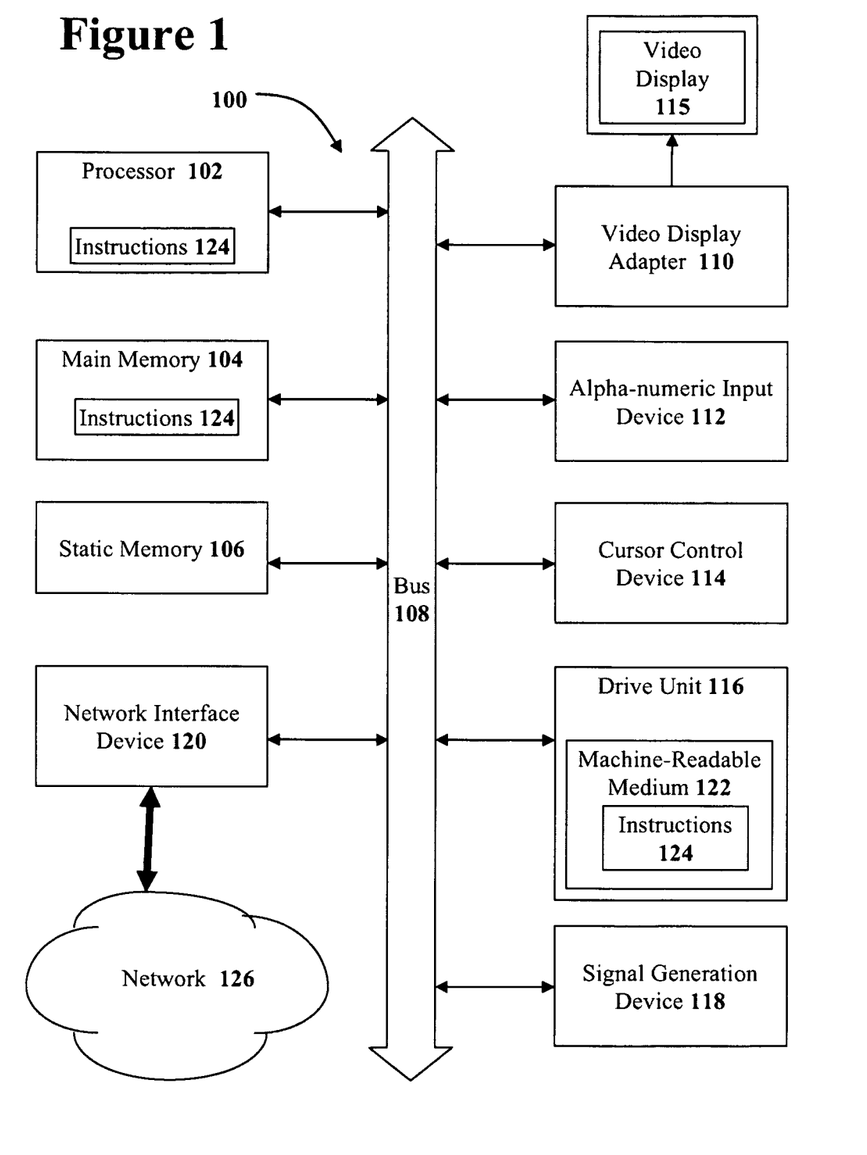
FIG. 1 illustrates a diagrammatic representation of a machine in the example form of a computer system within which a set of instructions, for causing the machine to perform any one or more of the methodologies discussed herein, may be executed.

FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of the machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

Note that various components present in the example computer system 100 are provided to illustrate one example computer system. A primitive computer system only needs to contain some type of processor, some type of memory for storing computer instructions that may be executed on that processor, and at least one input/output system such that the computer system may communicate with the outside world. All of these components (processor, memory, and input/output system) may be implemented on a single integrated circuit. Such single integrated circuit computer systems include System-On-a-Chip (SOC) integrated circuits, Peripheral Interface Controller (PIC) processors, and Application-Specific Integrated Circuits (ASICs) that include a processor, memory, and input/output components.

Referring to FIG. 1, the disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Example Thin-Client System

This document will disclose a copy protection system for an example thin-client terminal system as an example of a digital electronic device that may be protected. A thin-client terminal system includes a small digital electronic device that presents a familiar computer interface to a computer user that is using a remote computer system. In the example thin-client terminal system of this disclosure, the thin-client terminal system provides a video display, a keyboard, and a cursor control device to the user of the thin-client terminal system. These interface features are used to interact with a remote server computer system.

Figure 2A:
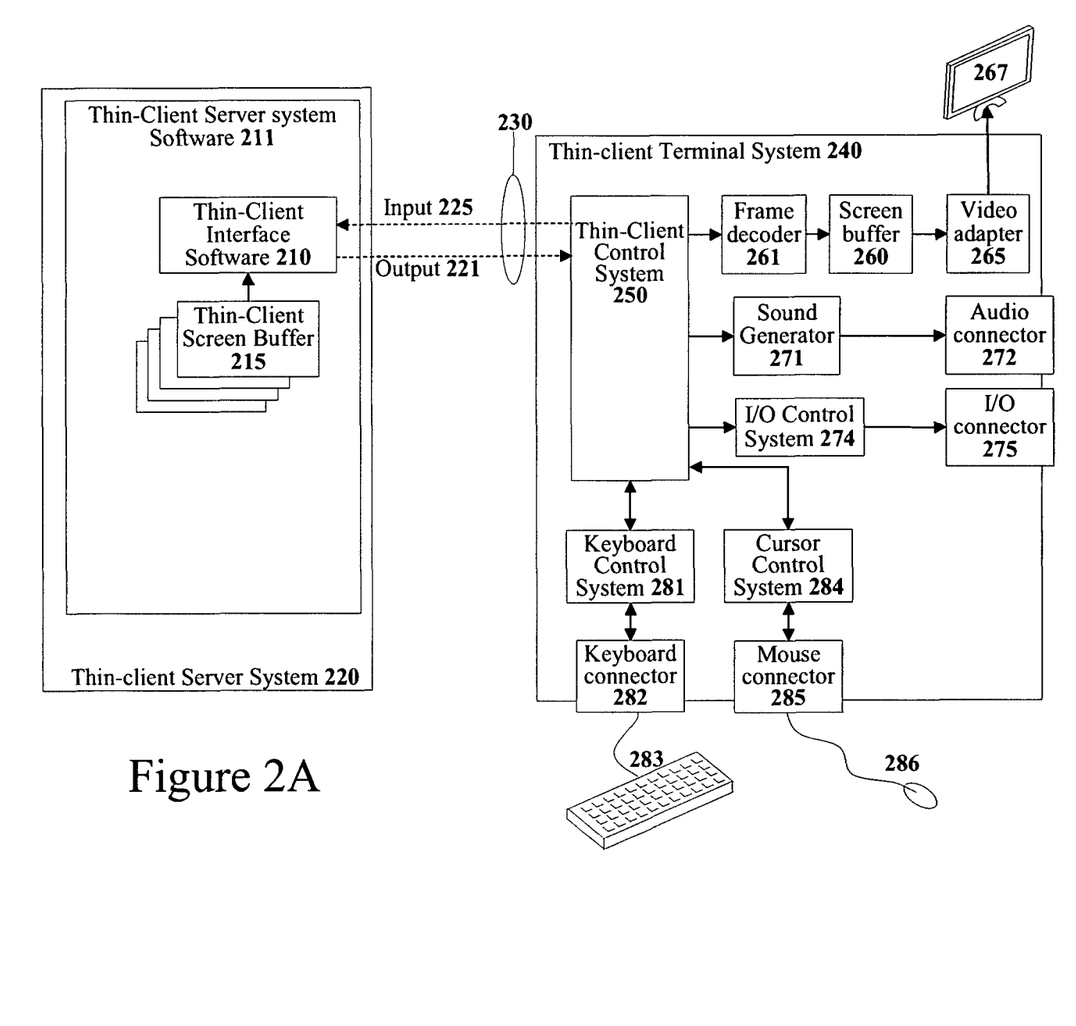
FIG. 2A illustrates a high-level block diagram of one embodiment of a thin-client terminal system coupled to a thin-client server computer system.

FIG. 2A illustrates a high-level block diagram of one embodiment of a thin-client server computer system 220 coupled to one (of possibly many) thin-client terminal system 240. The thin-client server computer system 220 and thin-client terminal system 240 are coupled with a bidirectional digital communications channel 230 that may be a serial data connection, an Ethernet connection, or any other suitable bi-directional digital communication means.

Figure 2B:
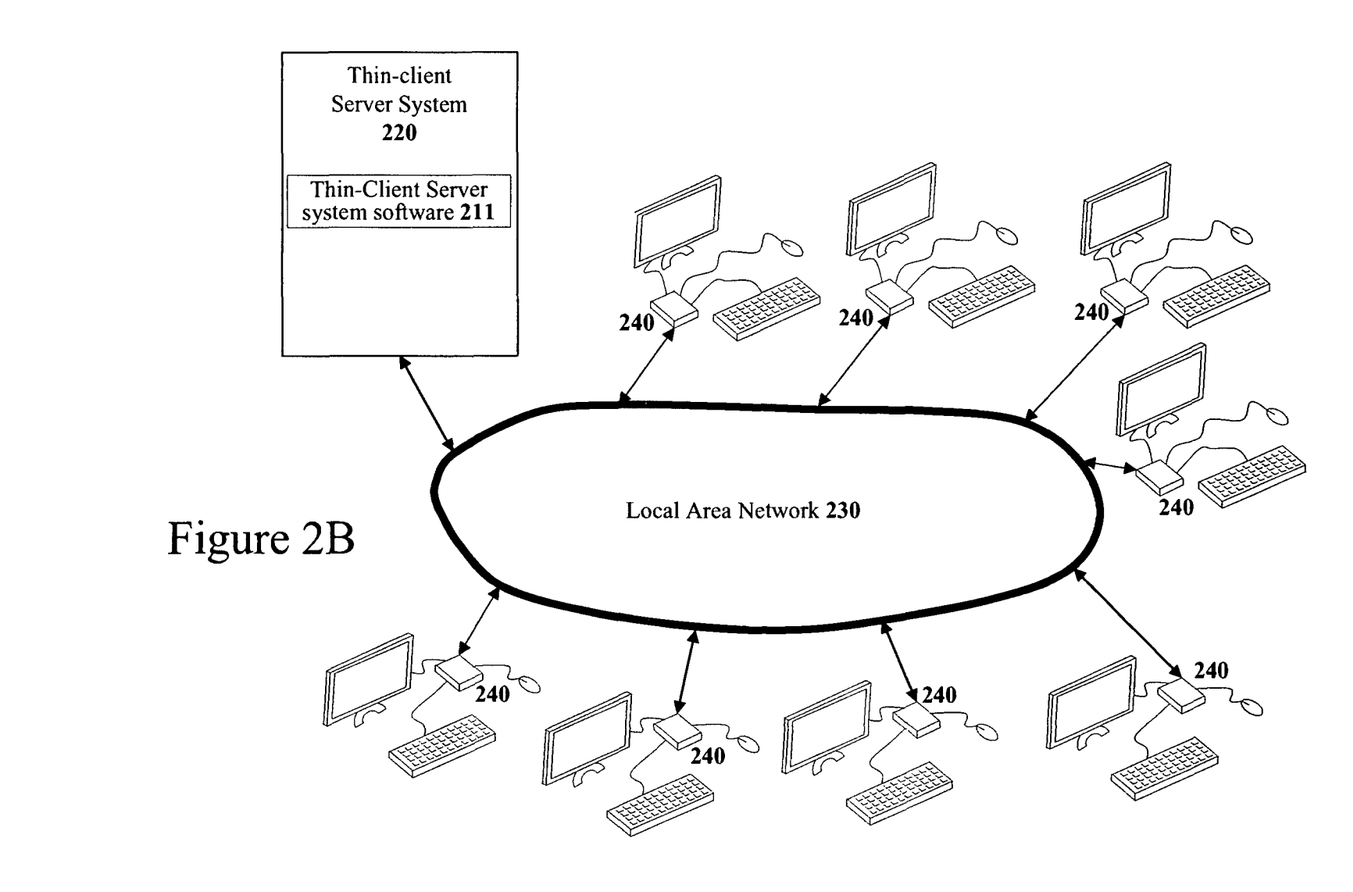
FIG. 2B illustrates a high-level block diagram of a single thin-client server computer system supporting multiple individual thin-client terminal systems using a local area network.

FIG. 2B illustrates a conceptual diagram of one embodiment of a thin-client environment. Referring to FIG. 2B, a single thin-client server computer system 220 executes thin-client server software 211 that provides computer processing resources to users at many thin-client terminal systems 240. In the particular embodiment of FIG. 2B, each of the individual thin-client terminal systems 240 is coupled to the thin-client server computer system 220 using local area network 230 as a bidirectional communication channel. The goal of thin-client terminal system 240 is to provide most or all of the standard input and output features of a personal computer system to the user of the thin-client terminal system 240.

Referring back to FIG. 2A, the thin-client terminal system 240 provides both visual and auditory output using a high-resolution video display system and an audio output system. The high-resolution video display system consists of a frame decoder 261, a screen buffer 260, and a video adapter 265. The frame decoder 261 decodes digital video information from the associated thin-client screen buffer 215 in the server and places that digital video information into screen buffer 260 thus making screen buffer 260 a copy of the bit-mapped display information in thin-client screen buffer 215. Video adapter 265 reads the video display information out of screen buffer 260 and generates a video display signal to drive display system 267. The screen buffer 260 is filled with video display information provided by thin-client control system 250 using video information sent as output 221 by the thin-client server system 220 across bi-directional communications channel 230. Specifically, a video frame encoder in the thin-client server system 220 sends information from a thin-client screen buffer 215 to the thin-client terminal system 240 so that the thin-client terminal system 240 can create a copy in its screen buffer 260.

The audio sound system of thin-client terminal system 240 operates in a similar manner. The audio system consists of a sound generator 271 coupled to an audio connector 272 for creating a sound signal. The sound generator 271 is supplied with audio information thin-client control system 250 using audio information sent as output 221 by the thin-client server system 220 across bi-directional communications channel 230.

From an input perspective, thin-client terminal system 240 allows for both alpha-numeric input and cursor control input from a terminal system user to be supplied to the thin-client computer system 220. The alpha-numeric input is provided by a keyboard 283 coupled to a keyboard connector 282 that supplies signals to a keyboard control system 281. Thin-client control system 250 encodes keyboard input from keyboard control system 281 and sends that keyboard input as input 225 to the thin-client server system 220. Similarly, the thin-client control system 250 encodes cursor control input from cursor control system 284 and sends that cursor control input as input 225 to the thin-client server system 220. The cursor control input is received through a mouse connector 285 from a computer mouse 286 or any other suitable cursor control device such as a trackball, trackpad, etc.

The thin-client terminal system 240 may include other input, output, or combined input/output systems in order to provide additional functionality to the user of the thin-client terminal system 240. For example, the thin-client terminal system 240 illustrated in FIG. 2A includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with thin-client server software 211 for interacting with multiple thin-client systems. The thin-client server software 211 creates individual sessions for each thin-client terminal system that requests access to the thin-client server system 220 and provides computing services to those thin-client terminal systems as is well-known in the art. As illustrated in FIG. 2A, thin-client interface software 210 of the thin-client server software 211 directly communicated the thin-client terminal system 240 as well as any other thin-client terminal systems coupled to thin-client server system 220. Each thin-client terminal system 240 will have its own screen buffer in the thin-client server system 220 such as thin-client terminal screen buffer 215.

Implementing Example Thin-Client System

Many different approaches may be used to implement the thin-client terminal system 240 of FIG. 2A (or other digital electronic devices). For example, the thin-client terminal system 240 may be implemented with a discrete microprocessor, discrete memory chips, and discrete input/output circuitry (such as the sound generator 271, the I/O control system 274, etc.). Such a microprocessor based system would be powerful and easily upgradeable, but such a microprocessor based system would also probably be very expensive to implement.

Another approach to implementing the thin-client terminal system 240 is to use a Field-Programmable Gate Array (FPGA). A field-programmable gate array is a semiconductor device that can be configured by a designer after manufacturing to implement many different types of digital circuits. FPGAs contain programmable logic components, and a hierarchy of reconfigurable interconnects that allow the logic components to be connected together according to a specific design. However, the programming code used to configure a FPGA can usually easily be accessed by a person attempting to reverse-engineer a device containing an FPGA such that digital electronic devices implemented with an FPGA may often be copied without an extraordinary effort.

Figure 2C:
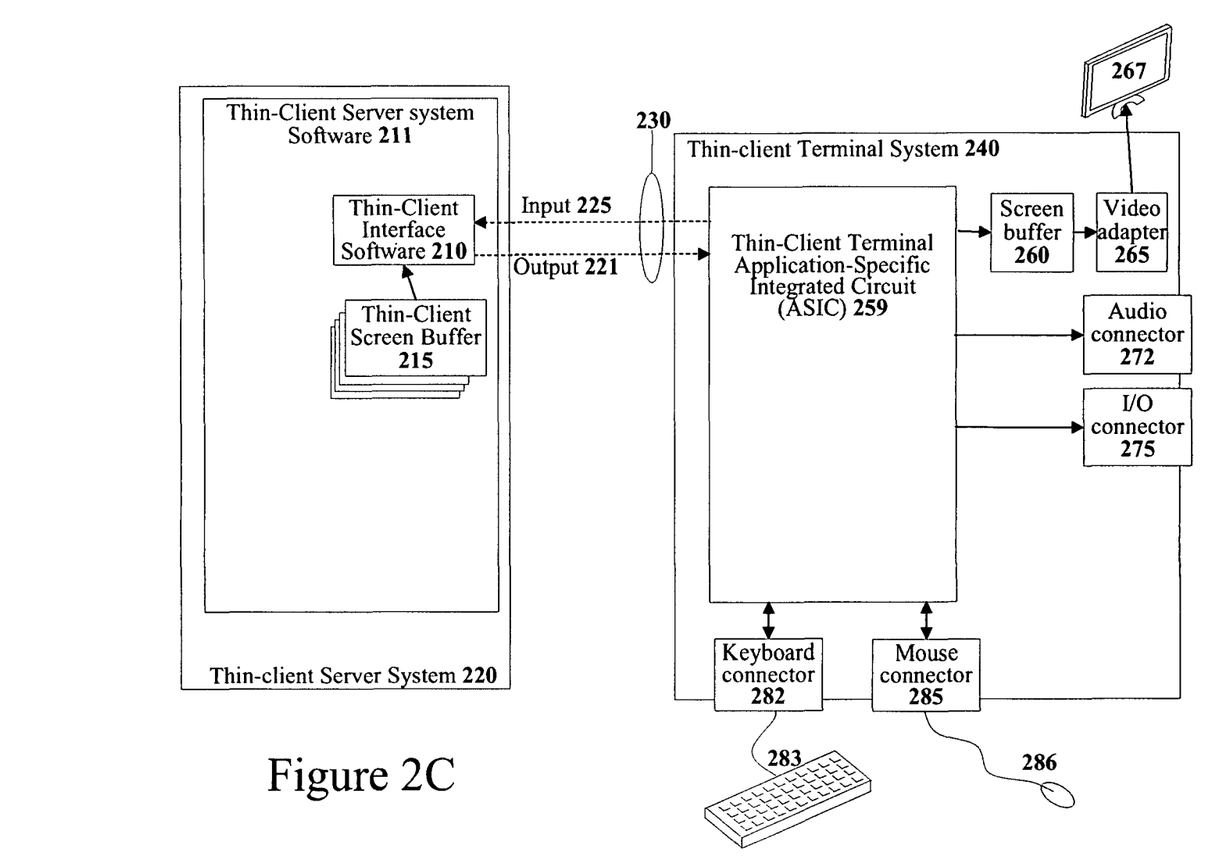
FIG. 2C illustrates the thin-client terminal system and thin-client server computer system of FIG. 2A wherein an application specific integrated circuit implements many features in the thin-client terminal system.

An Application Specific Integrated Circuit (ASIC) may also be used to implement the thin-client terminal system 240 of FIG. 2A (or other digital electronic devices). An Application Specific Integrated Circuit (ASIC) is an integrated circuit that has been designed for one particular application rather than for general-purpose use. Application Specific Integrated Circuits are generally constructed from a library of existing circuit designs that may be combined together in different arrangements to create an integrated circuit tailored for a specific application. When sufficiently large market for a particular integrated circuit exists, it is less expensive to create Application Specific Integrated Circuit than to use a Field-Programmable Gate Array. FIG. 2C illustrates a high-level block diagram of the thin-client terminal system 240 of FIG. 2A implemented with an Application Specific Integrated Circuit 259. The Application Specific Integrated Circuit 259 can be used to implement most of the different circuits needed to construct the thin-client terminal system 240.

Creating an Example Copy Protected Thin-Client System

As set forth above, a discrete implementation is generally too expensive and a Field-Programmable Gate Array may be relatively easy to copy. Thus, an Application Specific Integrated Circuit implementation may be a good selection since it cannot be easily be reverse engineered.

To fully reverse engineer an Application Specific Integrated Circuits, one either needs to create an entire "black box" model of the Application Specific Integrated Circuits or perform a physical deconstruction of the Application Specific Integrated Circuit to examine its contents. Creating a black box model involves presenting every possible input to the Application Specific Integrated Circuit to learn the corresponding output. With a large integrated circuit capable of an extremely large number of internal states, this is generally a very difficult task. Similarly, a physical deconstruction is an extremely difficult process wherein an entity attempting to reverse engineer an integrated circuit grinds away layer by layer of the integrated circuit and takes pictures with an electron microscope. Once again, this is an extremely complex and expensive task that is economically impractical. Thus, an Application Specific Integrated Circuit provides a good solution if copy protection is desirable.

Although reverse engineering an Application Specific Integrated Circuit using a black box approach is difficult, it can be performed when the overall purpose of the Application Specific Integrated Circuit is known and the inputs and outputs of the Application Specific Integrated Circuit can easily be monitored. Thus, it may be desirable to add extra circuitry that is deliberately designed to make the task of copying a valuable Application Specific Integrated Circuit very difficult.

In one embodiment, the present disclosure proposes an authentication module 256 created to prevent unauthorized copies of the thin-client terminal system 240 in general. The authentication module 256 may be implemented with a thin-client terminal ASIC 259 as illustrated in FIG. 2D such that copies cannot be made of the thin-client terminal ASIC 259.

The authentication module 256 may include a set of private keys 257 that cannot be read from outside of the thin-client terminal ASIC 259. The private keys 257 and methods within the authentication module 256 are used to authenticate the thin-client terminal system 240. In one embodiment, the authentication module 256 verifies the authenticity of the thin-client terminal ASIC 259 by receiving a token value, processing the token value with at least one private key 257 using a processing method in the authentication module 256, and then passing the processed token value back to an entity that verifies that the processed token value is authentic. Since neither the private keys 257 nor the processing methods within the authentication module 256 can be read from outside of the thin-client terminal ASIC 259, the authentication system of the authentication module 256 remains secure.

One Embodiment of Copy Protected Thin-Client System

Figure 2D:
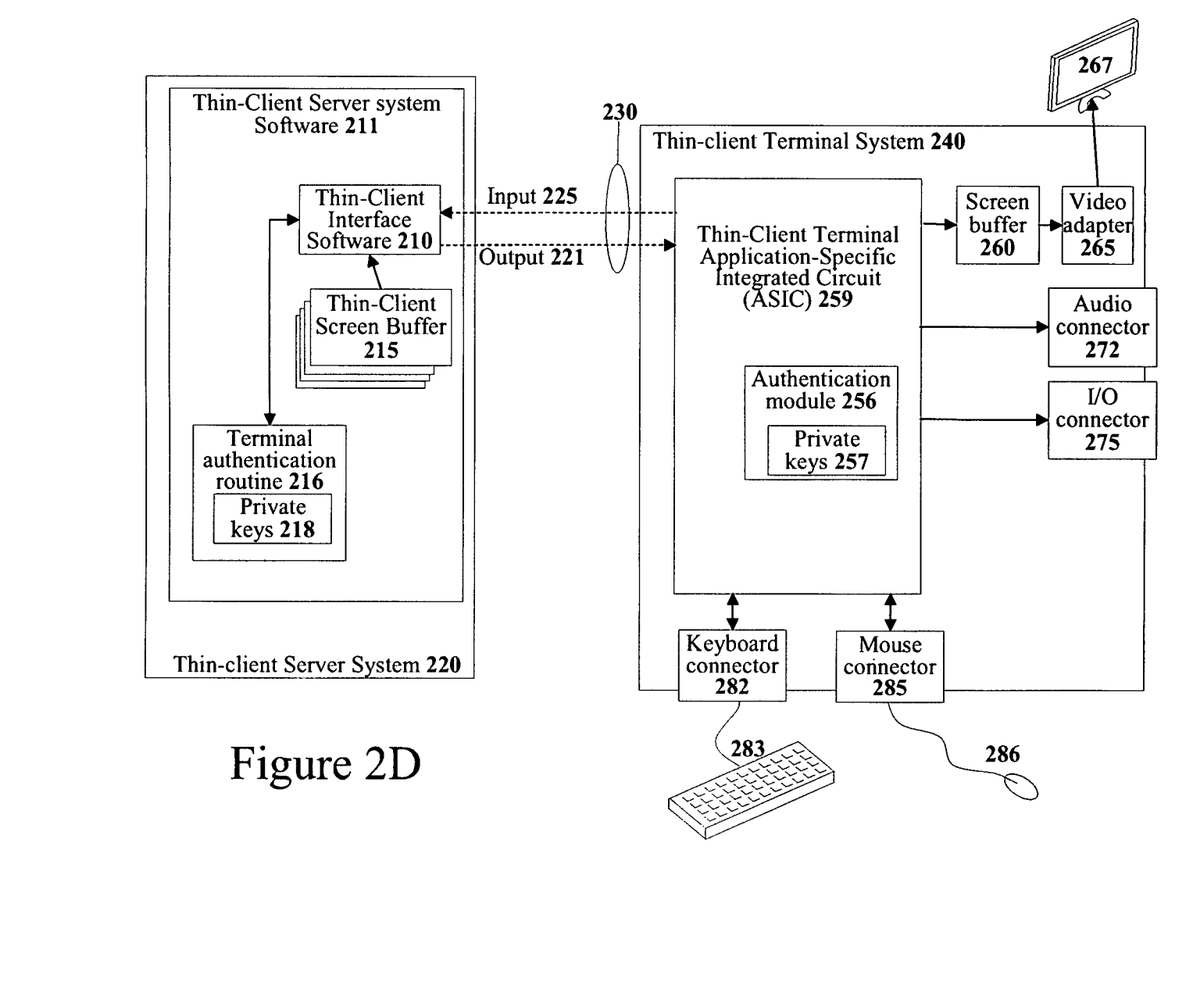
FIG. 2D illustrates the thin-client terminal system and thin-client server computer system of FIG. 2C further including copy protection components.
Figure 3:
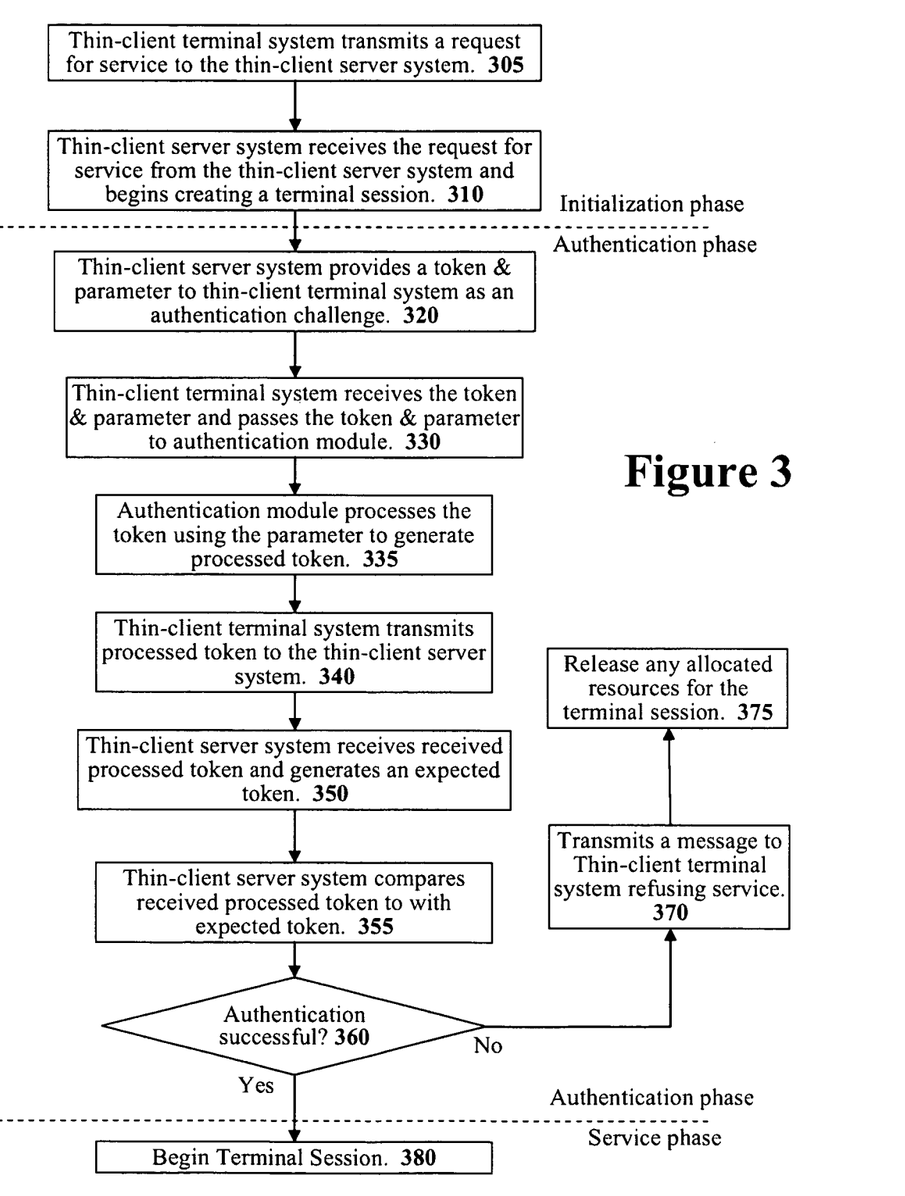
FIG. 3 illustrates a flow diagram describing the operation of the copy protection system.

An example embodiment of a copy protected thin-client terminal system is set forth with the block diagram of FIG. 2D and the flow diagram of FIG. 3. Referring to stage 305 at the top of FIG. 3, when a user wishes to use a thin-client terminal system, the user will turn on the thin-client terminal system and have the thin-client terminal system request service from its associated server system. Next, at stage 310, the thin-client server system will receive the request and begin creating a new terminal session for the thin-client terminal system 240. The thin-client server software 211 in the thin-client server system 220 may allocate some resources for the new terminal session. But before thin-client server system 220 provides service to the thin-client terminal system 240, the thin-client server software 211 enters an authentication phase at stage 320.

To begin the authentication at stage 320, a terminal authentication routine 216 in the thin-client server software 211 may generate a token value and a parameter value then transmit that token and parameter value in an authentication request message to the thin-client terminal system 240 requesting service. The token value may comprise an original token value that is to be modified and a parameter value that specifies the types of modifications to be performed on the token value. In one embodiment, the token and parameter values are combined into a single entity known as a token/parameter value.

Next, at stage 330, the thin-client terminal system 240 receives the authentication request message that includes the token value and the parameter value. The control system in the thin-client terminal system 240 passes the token value and the parameter value from the authentication request message to the authentication module 256 in the thin-client terminal ASIC 259. The authentication module 256 then parses the parameter value then processes the token value as specified by the parameter value to generate a processed token at stage 335. At stage 340, the control system in the thin-client terminal system 240 passes the processed token back to the thin-client server system 220.

At stage 350, the terminal authentication routine 216 in the thin-client server software 211 receives the processed token and generates an expected processed token. The terminal authentication routine 216 then compares the received processed token with the expected processed token at stages 355 and 360.

If the received processed token does not match the expected processed token then the thin-client server software 211 may proceed to stage 370 where a message is transmitted to the thin-client terminal system 240 specifying that service is being refused since the thin-client terminal system 240 is not authorized. The thin-client server software 211 may also release any resources allocated for that thin-client terminal system stage 375. The thin-client server software 211 may also note that it can ignore future service requests from that particular thin-client terminal system.

Referring back to the authentication test stage 360, if the processed token received from the thin-client terminal system 240 matches the expected processed token then the thin-client server software 211 may proceed to stage 380 where the terminal session for thin-client terminal system 240 begins. To further protect the system, the thin-client server software 211 may randomly perform additional authentication checks while the thin-client terminal system 240 is being used.

One Embodiment of an Authentication Module

The authentication module 256 may be implemented in many different manners. Design issues to consider may include the amount of die space to implement the authentication module 256, the ability to hide the private keys 257, the variety of private keys 257, the ability to hide the processing methods in the authentication module 256, and the variety of the processing methods in the authentication module 256. Since the authentication module 256 is only used to prevent unauthorized copies and does not actually provide functionality to the users of the thin-client terminal system, the amount of die area allocated to the authentication module 256 should be minimized. However, the designers should attempt to design the authentication module 256 in a manner that hides its functionality such that it is not easy to reverse engineer the authentication module 256. Finally, the amount of variety in both the private keys 257 and the processing methods should be maximized since this can be used to extend the protection system as shall be described later.

In one particular embodiment, the authentication module 256 uses private keys 257 that are embedded in the hardware. By embedding the private keys in the hardware, it will be very difficult for an attacker to obtain the private keys 257. The keys may be of any length but longer keys should provide greater security.

As set forth in stage 330 of FIG. 3, the authentication module 256 receives the token value and parameter value. The authentication module 256 selects (or creates) a private key from the set of private keys 257 with the parameter value. Then, the authentication module 256 processes the token value with the selected private key using one or more processing methods specified by the parameter. In one embodiment, the token value and the parameter value are combined into a single value, a token/parameter value, such that the same token/parameter value is used both as a parameter and the token for processing. In such an embodiment, various bits of the token/parameter value are used to select (or create) the private key that will be used and other bits are used to select the processing methods that will be used to process the token/parameter value.

Figure 4:
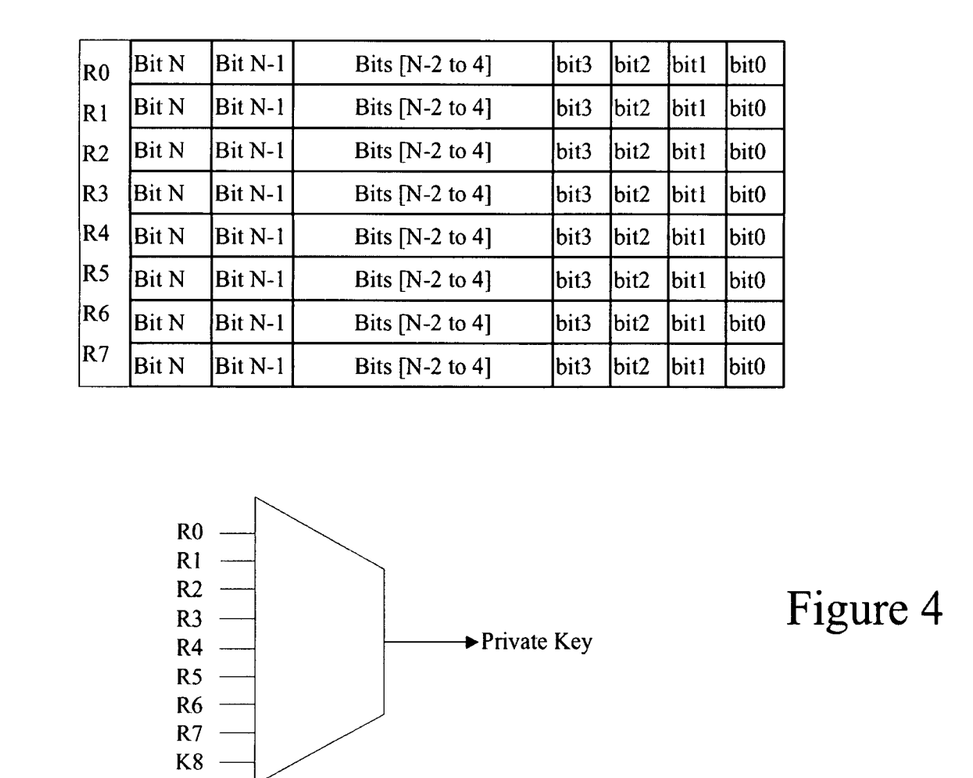
FIG. 4 illustrates the basic structure of the private keys in one embodiment.

The hardware logic inside authentication module 256 provides many different options for the selecting or forming the private key and selecting a processing method. FIG. 4 illustrates the basic structure of the private keys in one possible embodiment wherein eight private keys exist in the authentication module. The eight private keys in FIG. 4 are marked with R0 through R7. The multiplexer on FIG. 4 shows that another possible private key, key K8, may be selected which is formed using pieces of the other eight private keys R0 to R7. In one embodiment, various bits of the parameter value are used as global election bits for selecting or creating the private key and selecting the processing options. The definitions of these options are provided by way of example as follows:
  Private Key Options
  Private key option 1—Additional bits used to select one of the private keys.
  Private key option 2—Additional bits used to create a private key.
  Processing Method Option 1—Software requested output rotation selected—More bits define the rotation.
2—Automatic output rotation option selected.
3—Default option with no additional processing.
4—Private Key rotation selected—More bits define the rotation.
5—Output Inversion.
6—Output Scrambling.

Private Key Option 1—Predefined Private Keys:

The first private key option uses the most straightforward way to select a private key. In this particular case, a set of pre-defined bits of the parameter value may be used to select one of the embedded private keys 257.

Private Key Option 2—Generate Private Key

Figure 5:
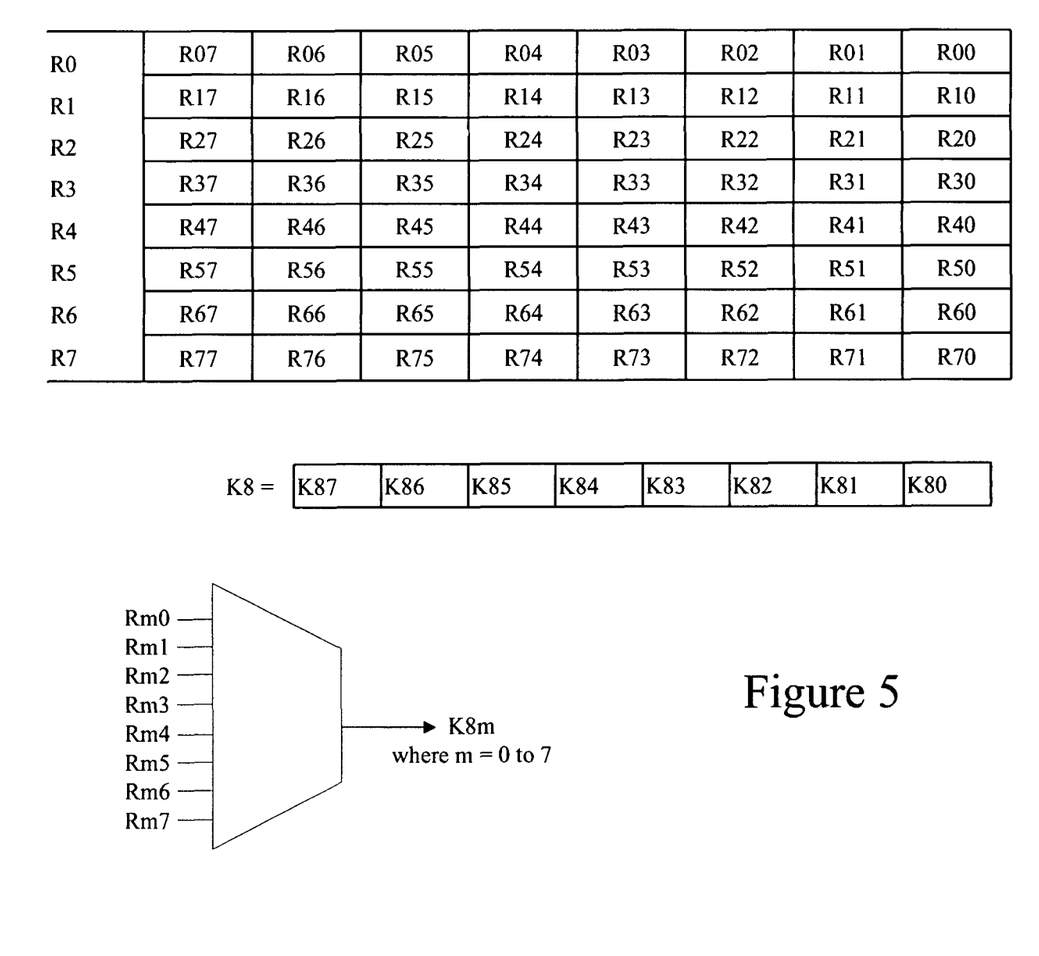
FIG. 5 illustrates how private keys may be combined to create a new private key in one embodiment.

Private key option 2 may allow the creation of a new private key using a combination of pieces from the eight pre-defined private key entries. Specifically, a set of parameter value bits may be used to select individual sections of a final private key wherein the various sections are combined to generate the final private key. FIG. 5 illustrates an example implementation of how a new private key may be formed from pieces of hardcoded private keys. In the example illustrated in FIG. 5, this second option creates a private key from eight different pieces of the eight different hardcoded private keys. It is to be noted here that the least significant portion of the newly created key comes from one of the eight pieces of R0. Various bits of the parameter value may be used to select bytes from the original embedded private keys (R0 to R7) to create a new synthesized private key.

A first subset of bits are used to select a portion from R0 to form K80

A second subset of bits are used to select a portion from R1 to form K81

A third subset of bits are used to select a portion from R2 to form K82

A fourth subset of bits are used to select a portion from R3 to form K83

A fifth subset of bits are used to select a portion from R4 to form K84

A sixth subset of bits are used to select a portion from R5 to form K85

A seventh subset of bits are used to select a portion from R6 to form K86

A eighth subset of bits are used to select a portion from R7 to form K87

The eight portions (K80, K81, K82, K83, K84, K85, K86, and K87) are concatenated together to create the newly created key K8. Note that this is only one simple method of this type of private key generation. Other implementations would scramble the various private key portions, use various sizes of private key portions, rotate the private key portions, and/or invert the private key portions.

Example Output Processing Methods

In one particular embodiment, the authentication module 256 uses an arbitrary processing method to process the token with the selected private key to generate an output which is expected by the thin-client server software 211. Specifically, in one embodiment, the final private key (chosen using one of key selection options and also after key rotation if selected) is used to process the input token value with the arbitrary processing method to create the processed output token value. The final output available from the authentication module 256 will then be dependent on the additional processing method chosen. The thin-client server software 211 will perform a similar calculation to generate the expected processed output token value.

One embodiment of the authentication module 256 provides several different output processing method options. As mentioned earlier, the processing method options are chosen by the parameter value (which may be bits in a combined token/parameter value) provided. An example set of these processing methods are described in more detail below.

Example Processing Method Option 1—Software Requested Output Rotation:

When this option is selected, the parameter value is used to decide how the output rotation will be performed. Specifically, a subset of bits from the parameter can be used to define a rotation direction and a rotation length. In one embodiment, a subset of bits from the parameter value is used for these bits. The number plugged into these bits will define the rotational length. It is expected that the same length will not be used for consecutive accesses. In fact, to start the loading process, a change in this number is required.

Example Processing Method Option 2—Auto Rotation:

With this processing method option selected, the output will be rotated right or left by a specified number of bit positions automatically every time the output of the authentication module 256 is read. The rotation direction and the rotation amount are specified by bits in the parameter value.

Example Processing Method Option 3—Default Option:

This is the default processing method option where no output processing method is performed. The final output of the authentication module 256 will be provided through the register read.

Example Processing Method Option 4—Software Requested Private Key Rotation:

When this option is selected, the thin-client server software 211 decides how the Private Key rotation will be done. In this particular case, the output of the arbitrary function generator will be provided directly without any output processing. Instead, a subset of bits in the parameter value may be used to define a private key rotation amount. The number plugged into these bits will define the rotational length. It is expected that the same length will not be used for consecutive accesses and again, to start the loading process, a change in this number is required.

Example Processing Method Option 5—Output Inversion:

When this option is selected, the output of the function generator will have all of the bits inverted. Specifically, a logical NOT operation will be performed on each of the output bits.

Example Processing Method Option 6—Output Scrambling:

When this option is selected, the output of the arbitrary function generator will have the various sections of the output value scrambled. For example., the key portion selection table illustrated in FIG. 5 may be used to select which portion of the arbitrary function output will be placed into which portion of the finalized output. Note, the same portions of the arbitrary function output may be used more than once.

Note that the above methods of selecting a key and performing output processing merely comprise one possibly set of key formation systems and output processing systems. Many others may be used instead of or in addition to these particular methods.

Example of Protecting the Authentication Software

As illustrated in FIG. 2D, the authentication module 256 is embedded within hardware such that it is difficult for any attacker to view or reverse engineer. However, the terminal authentication routine 216 resides in the thin-client server software 211 on the thin-client server system 220. Thus, an attacker may instead attempt to attack the terminal authentication routine 216 in the thin-client server software 211 to determine how the authentication module 256 operates.

This type of attack tactic can be foiled by only using a limited capacity of the authentication capability within the authentication module 256 in each major software update. For example, a first version of the thin-client server software 211 (that includes the terminal authentication routine 216) may only contain a first private key and use a few of the output processing options. If an attacker reverse engineers that terminal authentication routine 216 to create an attempted copy of the authentication module 256 then the thin-client terminal system 240 containing that attempted copy of the authentication module will fail when a subsequent update of the thin-client server software 211 (that includes the terminal authentication routine 216) begins using a second private key within the authentication module 256. In this manner, additional software updates that successively use more and more of the authentication module 256 will prevent an attacker from successfully using the terminal authentication routine 216 to create a model of the authentication module 256. Provided there are enough keys and processing method options, an attacker would never be able to create a fully accurate copy of the thin-client terminal system 240 before the product become obsolete.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of authenticating an electronic device, said method comprising:
   transmitting a token value and a parameter value to said electronic device;
   creating a generated private key using said parameter value, said generated private key being created using a combination of at least a portion of at least one private key within a set of stored private keys stored on said electronic device;
   selecting a private key from a set of private keys using a multiplexer of said electronic device including selecting said selected private key using said parameter value as an input to said multiplexer, said set of private keys including said set of stored private keys and said generated private key;
   processing, by said electronic device, said token value with said selected private key using a particular method specified by said parameter value to generate a processed token;
   wherein said selecting said selected private key and said processing said token value are performed within an integrated circuit and wherein said selected private key and said processing said token value are not externally readable from outside of the integrated circuit;
   comparing said processed token with an expected processed token; and
   authenticating said electronic device if said processed token compares favorably with said expected processed token.

2. The method of authenticating an electronic device as set forth in claim 1 wherein said processing said token value comprises a logical exclusive-OR operation.

3. The method of authenticating an electronic device as set forth in claim 1 wherein said processing said token value comprises rotating said token.

4. The method of authenticating an electronic device as set forth in claim 3 wherein said rotating said token comprises rotating said token a value specified by said parameter value.

5. The method of authenticating an electronic device as set forth in claim 1 wherein said token value and said parameter value comprise a single value known as a token/parameter value.

6. The method of authenticating an electronic device as set forth in claim 1 wherein said steps of transmitting, comparing, and authenticating are performed by software.

7. The method of authenticating an electronic device as set forth in claim 6 wherein said software is periodically replaced with updated software, said updated software using a new parameter value not used as said parameter value by said existing software.

8. The method of claim 1, further comprising:
   randomly performing additional authentication of said electronic device while said electronic device is being used.

9. An electronic device having a security system, said electronic device comprising:
   receiving communication circuitry for receiving a token value and a parameter value from an authenticator;
   authentication circuitry, said authentication circuitry:
      creating a generated private key using said parameter value, said generated private key being created using a combination of at least a portion of at least one private key within a set of stored private keys stored on said electronic device;
      selecting a private key from a set of private keys using said parameter value as an input to a multiplexer of said authentication circuitry, said set of private keys including said set of stored private keys and said generated private key;
      processing said token value with said private key using a particular method specified by said parameter value to generate a processed token;
   wherein said authentication circuitry is implemented within an integrated circuit and wherein said selected private key and said processing said token value are not externally readable from outside of the integrated circuit; and
   transmitting communication circuitry for transmitting said processed token to said authenticator, said authenticator authenticating said electronic device by comparing said processed token with an expected processed token.

10. The electronic device as set forth in claim 9 wherein said processing said token value comprises rotating said token.

11. The electronic device as set forth in claim 10 wherein said rotating said token comprises rotating said token a value specified by said parameter value.

12. The electronic device as set forth in claim 9 wherein said token value and said parameter value comprise a single value known as a token/parameter value.

13. The electronic device as set forth in claim 9 wherein said authenticator comprises software.

14. The electronic device as set forth in claim 13 wherein said software is periodically replaced with updated software, said updated software using a new parameter value not used as said parameter value by said existing software.

15. An electronic device having a security system, said electronic device comprising:
   means for receiving a token value and a parameter value from an authenticator;
   processing means, said processing means for:
      creating a generated private key using said parameter value, said generated private key being created using a combination of at least a portion of at least one private key within a set of stored private keys stored on said electronic device;
      selecting a private key from a set of private keys using said parameter value as an input to a multiplexer of said processing means, said set of private keys including said set of stored private keys and said generated private key;
      processing said token value with said private key using a particular method specified by said parameter value to generate a processed token;
      wherein said processing means is implemented within an integrated circuit and wherein said selected private key and said processing said token value are not externally readable from outside of the integrated circuit; and
   means for transmitting said processed token to said authenticator, said authenticator authenticating said electronic device by comparing said processed token with an expected processed token.

16. The electronic device of claim 9, wherein said authenticator randomly performs additional authentication of said electronic device while said electronic device is being used.

17. The electronic device as set forth in claim 15 wherein said token value and said parameter value comprise a single value known as a token/parameter value.

18. The electronic device as set forth in claim 15 wherein said authenticator comprises software.

19. The electronic device as set forth in claim 18 wherein said software is periodically replaced with updated software, said updated software using a new parameter value not used as said parameter value by said existing software.

20. The electronic device of claim 15, wherein said authenticator randomly performs additional authentication of said electronic device while said electronic device is being used.

\* \* \* \* \*